United States Patent Office 2,794,034
Patented May 28, 1957

2,794,034
PROCESS FOR PREPARING 17-HYDROXY COMPOUNDS OF THE STEROID SERIES

Heinrich Ruschig, Bad Soden am Taunus, Josef Schmidt-Thomé and Werner Fritsch, Frankfurt am Main, and Werner Haede, Hofheim (Taunus), Germany, assignors to Farbwerke Hoechst Aktiengesellschaft vormals Meister Lucius & Brüning, Frankfurt am Main, Germany, a corporation of Germany No Drawing. Application January 31, 1956,
Serial No. 562,577

Claims priority, application Germany February 7, 1955

2 Claims. (Cl. 260—397.4)

The present invention relates to a method of preparing 17-hydroxy componds of the steroid series by reacting ketimines of the steroid series with acylating agents, oxidising the products of this reaction with organic peracids—if necessary, i. e. in the nonsaturated series, after partial hydrolysis and oxidation of the hydroxyl groups thus formed to carbonyl groups—and finally treating the oxidation products with hydrolysing agents.

Now, we have found that it is possible to avoid the stage of the partial hydrolysis when preparing 17-hydroxy compounds of the steroid series by oxidising $\Delta^{5.17(20)}$-pregnadiene - ol - (3$\beta$) - acylamine-(20)-acylate with organic peracids and reacting the oxidation products with hydrolysing agents. The reaction takes place according to the following scheme:

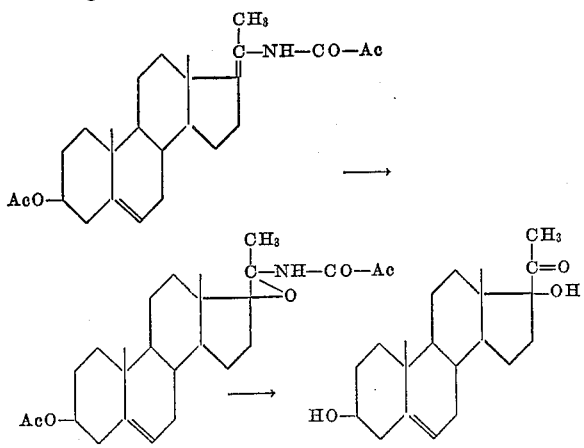

The process according to the invention shows the advantage that apart from one stage of operation being omitted, considerably improved yields are obtained since the acyl group in 3-position evidently exerts a protective action on the $\Delta^5$ double bond.

According to the method described by Gallagher (J. Am. Chem. Soc., volume 73 (1951) pages 184 et seq.) it has hitherto not been possible partially to oxidize unsaturated $\Delta^{5.17(20)}$-pregnadiene-ol-(3$\beta$)-enolacylate-(20)-acylate with perbenzoic acid in 17.20 position, since the $\Delta^5$ double bond is equally attacked, undefinable mixtures being obtained. It could, therefore, not be expected that, in contradistinction thereto, when using corresponding enacyl-amine compounds the oxidation in order to obtain 17.20-oxido-compounds and their hydrolysis could be carried out in good yields.

Addition of oxygen at the 17.20-position of the double bond of the starting materials is effected in known manner by means of organic peracids. It is useful to carry out the oxidation with protection, i. e. in weakly concentrated solutions and at temperatures between −20° C. and +20° C., preferably at about 0° C. As solvents there are suitable, for instance, aromatic hydrocarbons such as benzene, toluene, xylene or the corresponding mixtures thereof.

As organic peracids there come into consideration, for instance, aromatic peracids such as perbenzoic acid, phthalic mono-peracid, or saturated aliphatic peracids such as performic acid, peracetic acid or persuccinic acid. The peracids need not be used in the free state, they may be produced as intermediary substances during the reaction by addition of peroxides, for instance sodium peroxide or barium peroxide to the organic acids present. Alternatively a mixture of hydrogen peroxide and glacial acetic acid may be used.

The hydrolysis of the 17.20-oxido compound is suitably carried out by means of dilute alkali liquors such as sodium hydroxide solution or potassium hydroxide solution. It is favourable to work in a nitrogen atmosphere and to heat the reaction mixture for some time, appropriately to the boiling point of the solvent used.

The products obtained according to the process are valuable intermediary products for the preparation of medicaments, for instance Cortison, and they can be transformed according to known methods, for instance also into 17$\alpha$-hydroxy-progesterone, which represents a valuable starting material for making repository preparations showing progesterone efficiency.

The following example serves to illustrate the invention but it is not intended to limit it thereto:

Example $\Delta^5$-17$\alpha$-HYDROXY-PREGNENE-OL-(3$\beta$)-ONE-(20)

A solution of 313 milligrams of perbenzoic acid in a mixture of 60 cc. of benzene and 6 cc. of toluene is slowly run within 1 hour, while stirring and cooling to 0° C., into a solution of 1.00 gram of $\Delta^{5.17(20)}$-pregnadiene-ol-(3$\beta$)-acetylamine-(20)-acetate in a mixture of 80 cc. of benzene and 9 cc. of toluene. The reaction mixture is stirred for a further 20 minutes (until the perbenzoic acid will be consumed). The reaction mixture is then diluted with 100 cc. of ether, shaken with 0.3-N sodium hydroxide solution in order to eliminate the benzoic acid formed and washed with water until neutral. After drying over sodium sulphate the solvent is distilled off under reduced pressure at a maximum temperature of the bath of 25° C.

The residue, i. e. the crude 17.20-oxido-$\Delta^5$-pregnene-ol-(3$\beta$)-acetylamine-(20)-acetate is dissolved in 126 cc. of cold methanol. 62 cc. of 0.3-N sodium hydroxyde solution are added, the mixture is heated for 1 hour under reflux in a nitrogen atmosphere until boiling. After cooling it is neutralized with 2 N acetic acid and allowed to stand over night at room temperature. Hereby, the $\Delta^5$-17$\alpha$-hydroxy-pregnene-ol-(3$\beta$) - one - (20) crystallizes out. After filtration and washing of the filter residue with a little acetone and ether 537 mgms. of a crude product are obtained having a melting point of 262–263° C. (on the Kofler heater). The product can be further purified by recrystallization from hot glacial acetic acid and then melts at 272–274° C. (on the Kofler heater). It is identical with standard $\Delta^5$-17$\alpha$-hydroxy-pregnene-ol-(3$\beta$)-one-(20) as could be proved by the melting point of a mixture of the product with standard $\Delta^5$-17$\alpha$-hydroxy-pregnene-ol-(3$\beta$)-one-(2) and the infrared spectrum.

We claim:

1. A process for preparing 17-hydroxy-compounds of the steroid series which comprises oxidizing $\Delta^{5.17(20)}$-pregnadiene-ol-(3$\beta$)-acylamine-(20) - acylates by means of organic peracids and hydrolysing the oxidation products obtained by means of dilute alkaline solutions.

2. A process as claimed in claim 1 wherein perbenzoic acid is used as organic peracid.

References Cited in the file of this patent
UNITED STATES PATENTS
2,731,461   Ruschig ---------------- Jan. 17, 1956